US012285950B2

(12) United States Patent
Shin

(10) Patent No.: US 12,285,950 B2
(45) Date of Patent: Apr. 29, 2025

(54) INK STORAGE APPARATUS WITH ROTATING TYPE INK STORAGE POUCH AND INK-JET PRINTER HAVING SAME

(71) Applicant: GOSANTECH CO., LTD., Cheonan-si (KR)

(72) Inventor: Dongkyun Shin, Sejong-si (KR)

(73) Assignee: GOSANTECH CO., LTD., Cheonan-si (KR)

( * ) Notice: Subject to any disclaimer, the term of this patent is extended or adjusted under 35 U.S.C. 154(b) by 216 days.

(21) Appl. No.: 18/296,514

(22) Filed: Apr. 6, 2023

(65) Prior Publication Data

US 2024/0165958 A1 May 23, 2024

(30) Foreign Application Priority Data

Nov. 23, 2022 (KR) ........................ 10-2022-0158730

(51) Int. Cl.
*B41J 2/175* (2006.01)
*B41J 2/18* (2006.01)

(52) U.S. Cl.
CPC ....... *B41J 2/17513* (2013.01); *B41J 2/17509* (2013.01); *B41J 2/17556* (2013.01); *B41J 2/17566* (2013.01); *B41J 2/18* (2013.01); *B41J 2002/17516* (2013.01)

(58) Field of Classification Search
CPC .... B41J 2/175; B41J 2/17503; B41J 2/17506; B41J 2/17509; B41J 2/17513; B41J 2/17556; B41J 2/17566; B41J 2/18; B41J 2/17596; B41J 2002/17516
See application file for complete search history.

(56) References Cited

U.S. PATENT DOCUMENTS

2010/0103233 A1* 4/2010 Akatsuka .................. B41J 2/19 347/92
2012/0056948 A1* 3/2012 Kim .................... B41J 2/17509 347/85
2012/0200649 A1* 8/2012 Igawa ..................... B41J 2/175 347/89

FOREIGN PATENT DOCUMENTS

JP 2001-322297 A 11/2001
KR 10-0661101 A 12/2006
KR 10-2012-0132939 A 12/2012
KR 10-2139137 A 7/2020

* cited by examiner

*Primary Examiner* — Anh T Vo
(74) *Attorney, Agent, or Firm* — Sughrue Mion, PLLC

(57) ABSTRACT

Disclosure relates to an ink storage apparatus with a rotating type ink storage pouch. The ink storage apparatus storing ink to supply the ink to an ink-jet head includes a nozzle ejecting ink includes an ink pouch configured to store ink to supply the stored ink to the ink-jet head, an airtight casing connected to a gas pressure control system, a pouch holding part configured to hold the ink pouch while the ink pouch is inclined at a predetermined angle, and a pouch rotating part configured to rotate the pouch holding part on a predetermined rotating shaft to agitate the ink stored in the ink pouch, wherein the gas pressure control system is configured to control gas pressure of an internal space of the airtight casing, thereby allowing the ink stored in the ink pouch to maintain the meniscus state thereof at the ink-jet head.

10 Claims, 4 Drawing Sheets

INK STORAGE APPARATUS WITH ROTATING TYPE INK STORAGE POUCH AND INK-JET PRINTER HAVING SAME

CROSS REFERENCE TO RELATED APPLICATION

The present application claims priority to Korean Patent Application No. 10-2022-0158730 Nov. 23, 2022, the entire contents of which is incorporated herein for all purposes by this reference.

BACKGROUND OF THE INVENTION

Field of the Invention

The present disclosure relates to an ink storage apparatus in which ink supplied to an ink-jet head in an ink-jet printer is stored. More particularly, the present disclosure relates to an ink storage apparatus and an ink-jet printer having the same, the ink storage apparatus being capable of preventing ink stored in the ink storage apparatus or an ink droplet from being introduced into a gas pressure control system and of maintaining the dispersibility of the stored ink.

Description of the Related Art

Currently, devices for ejecting liquid are used in industrial fields for various purposes. For example, for the purpose of printing a specific shape such as an electric circuit, liquid is ejected to a desired location to form a pattern, in order to manufacture thin fibers, liquid may be ejected thinly, and in order to coat a surface, liquid may be ejected onto the surface of an object to be coated.

An inkjet method ejecting liquid ink in the form of droplets on a surface of a medium according to a shape signal has been used as not only printing to create documents or flyers, but also a solution process in the semiconductor and display fields.

The application range of inkjet printing, which can form complex patterns on a substrate or precisely eject ink only at a specific location, is expanding. A small ink-jet printer for document creation has a form of storing ink in an ink-jet head that ejects ink droplets. However, an ink-jet printer manufactured for large-scale document preparation or industrial use uses a large amount of ink, so a structure in which an ink storage and an ink-jet head are separated is applied thereto.

Furthermore, in order to eject ink by a precise amount in the ink-jet printing process, ink in preparation for ejection in in the ink-jet head should maintain a meniscus state, in which the ink is formed in a curved surface state that is concave inward by capillary action based on a nozzle inlet. To this end, a location of the ink storage part for supplying ink to the ink-jet head is located higher than a location of the ink-jet head, and the ink storage part for head supply is located higher than the inkjet head, and instead, by using the gas pressure control system, the inside of the ink storage for supplying ink to the ink-jet head is maintained in a vacuum to generate negative pressure in the ink storage part for head supply to prevent ink from flowing down in the ink-jet head, so it is possible to maintain the meniscus state.

However, as ink is excessively filled into the ink storage apparatus or an ink droplet generated in the ink storage apparatus is introduced into the gas pressure control system, failure of the gas pressure control system often occurs.

FIG. 4 is a view showing relationship between the ink storage apparatus in which ink is stored and a gas pressure control system in the conventional ink-jet printer. FIG. 5 is a view showing a droplet of ink that flows toward the gas pressure control system, between the ink storage apparatus storing ink and the gas pressure control system in the conventional ink-jet printer.

As described above, in order to maintain the meniscus state for the ink-jet head of the ink-jet printer, the gas pressure control system 20 applies negative pressure with respect to the internal space of the ink storage apparatus 10. Applying negative pressure by the gas pressure control system 20 with respect to the internal space of the ink storage apparatus 10 is a state in which the gas pressure control system 20 suctions air filled inside the ink storage apparatus 10, and FIG. 4 shows this state. Therefore, in this state, the internal space is in a state where ink is easy to be excessively filled into the ink storage apparatus 10 or an ink droplet generated in the ink storage apparatus 10 is easy to be introduced into the gas pressure control system 20. As shown in FIG. 5, droplets floating inside the ink storage apparatus 10 are introduced into the gas pressure control system 20 via a pressure control tube 21. As described above, when ink excessively filled in the ink storage apparatus or ink droplets generated and floating inside the ink storage apparatus 10 continue to be introduced into the gas pressure control system 20, inside the gas pressure control system 20, a problem such as ink condensation or corrosion due to high humidity occurs, and condensed ink or corrosion of parts therein is a major cause of failure of the gas pressure control system.

When a filter is applied between the ink storage apparatus and the gas pressure control system in order to prevent the above problem, since there is a problem with pressure control, the ink storage apparatus is configured to the extent of adding a simple protective device, but adding the simple protective device is not a fundamental solution to preventing ink from being introduced into the gas pressure control system.

Furthermore, recently, as the application fields of the ink-jet printer have diversified, attempts to use ink in which particles are dispersed are increasing, such as the case of applying ink in which metal particles are dispersed for electrode patterns. Attempts to apply ink in which flat panel display materials or OLED materials are dispersed are also increasing. However, ink-jet printing cannot be applied due to problems such as lowering the dispersibility of ink, such as metal particles, flat panel display materials, or OLED materials sinking due to weights thereof while the ink is stored in the ink storage part for supplying ink to the ink-jet head.

In order to maintain the dispersibility of ink, techniques such as installing an agitator inside the ink storage apparatus have been developed, but since there is a limit to agitating only stored ink while maintaining the meniscus state, the type of ink applied to industrial ink-jet printing is limited.

Documents of Related Art

Korean Patent No. 10-2139137

SUMMARY OF THE INVENTION

Accordingly, the present disclosure has been made keeping in mind the above problems occurring in the related art, and an objective of the present disclosure is intended to provide an ink storage apparatus and an ink-jet printer having the same, the ink storage apparatus being capable of preventing ink stored in the ink storage apparatus or an ink droplet from being introduced into a gas pressure control system and simultaneously of maintaining the dispersibility of the ink.

In order to achieve the above objective, according to an aspect of the present disclosure, there is provided an ink storage apparatus with a rotating type ink storage pouch, the storage apparatus being configured to store ink to supply the ink to an ink-jet head including a nozzle ejecting ink, the ink storage apparatus including: an ink pouch made of a flexible material, and configured to store ink therein and to supply the stored ink to the ink-jet head; an airtight casing in which the ink pouch may be provided, the airtight casing being connected to a gas pressure control system; a pouch holding part provided inside the airtight casing, and configured to hold the ink pouch while the ink pouch may be inclined at a predetermined angle; and a pouch rotating part configured to rotate the pouch holding part on a predetermined rotating shaft to agitate the ink stored in the ink pouch, wherein the gas pressure control system may be configured to control gas pressure of an internal space of the airtight casing, the internal space being separated from the ink, thereby allowing the ink stored in the ink pouch to maintain the meniscus state thereof at the ink-jet head.

The ink storage apparatus may include: two anti-twist connecting parts located on the rotating shaft of the pouch holding part, and to which a supply flow path and a recovery flow path may be respectively connected, wherein first ends of the supply flow path and the recovery flow path may be connected to the ink pouch and a second end of the supply flow path may allow ink to be supplied to the ink-jet head and a second end of the recovery flow path may allow ink discharged from the ink-jet head to be injected back to the ink pouch.

An additional supply flow path configured to add ink to the ink pouch may be connected to the recovery flow path or one of the anti-twist connecting parts to which the recovery flow path may be connected.

The ink storage apparatus may include: a weight measurement part configured to measure weight of the ink stored in the ink pouch to obtain the amount of the ink stored in the ink pouch.

The ink storage apparatus may include: a leakage detection sensor provided on a bottom of the airtight casing and configured to detect leaking ink.

According to another embodiment of the present disclosure, there is provided an ink-jet printer having an ink storage apparatus with a rotating type ink storage pouch, the ink-jet printer including: an ink-jet head including a nozzle ejecting ink; the ink storage apparatus configured to store ink to supply the ink to the ink-jet head; and a gas pressure control system connected to the ink storage apparatus and configured to control internal pressure such that the ink stored in the ink storage apparatus may maintains the meniscus state thereof at the ink-jet head, wherein the ink storage apparatus may include: an ink pouch made of a flexible material, and configured to store ink therein and to supply the stored ink to the ink-jet head; an airtight casing in which the ink pouch may be provided, the airtight casing being connected to a gas pressure control system; a pouch holding part provided inside the airtight casing, and configured to hold the ink pouch while the ink pouch may be inclined at a predetermined angle; and a pouch rotating part configured to rotate the pouch holding part on a predetermined rotating shaft to agitate the ink stored in the ink pouch, wherein the gas pressure control system may be configured to control gas pressure of an internal space of the airtight casing, the internal space being separated from the ink, thereby allowing the ink stored in the ink pouch to maintain the meniscus state thereof at the ink-jet head.

The ink-jet printer may include: two anti-twist connecting parts located on the rotating shaft of the pouch holding part, and to which a supply flow path and a recovery flow path may be respectively connected, wherein first ends of the supply flow path and the recovery flow path may be connected to the ink pouch and a second end of the supply flow path may allow ink to be supplied to the ink-jet head and a second end of the recovery flow path may allow ink discharged from the ink-jet head to be injected back to the ink pouch.

An additional supply flow path configured to add ink to the ink pouch may be connected to the recovery flow path or one of the anti-twist connecting parts to which the recovery flow path may be connected.

The ink-jet printer may include: a weight measurement part configured to measure weight of the ink stored in the ink pouch to obtain the amount of the ink stored in the ink pouch.

The ink-jet printer may include: a leakage detection sensor provided on a bottom of the airtight casing and configured to detect leaking ink.

As described above, the present disclosure is configured to store ink in the ink pouch located inside the airtight casing, so that an effect of preventing in advance the ink or an ink droplet from being introduced into the gas pressure control system can be obtained.

Furthermore, ink is constantly agitated by rotating the ink pouch in which ink is stored, so that an effect of maintaining the uniformity of ink ingredients and maintaining uniformly distributed state of particulate matter included in the ink can be obtained.

Moreover, the amount of ink filled in the ink pouch is precisely confirmed by using the load cell, so that an effect of preventing problems such as excessively injecting of ink or replenishing of improper amount of ink can be obtained.

DETAILED DESCRIPTION OF THE INVENTION

Figure 1:
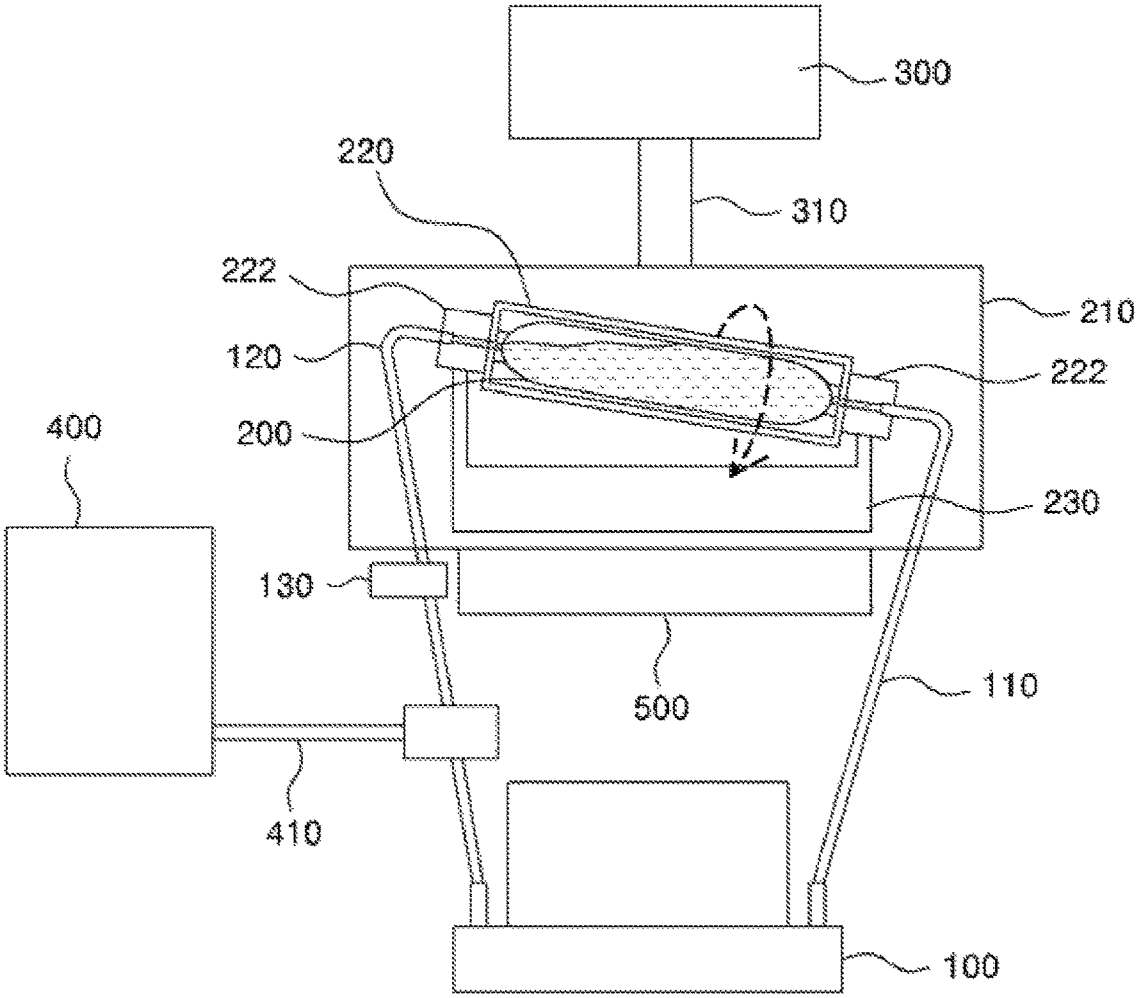
FIG. 1 is a view showing an ink storage apparatus with a rotating type ink storage pouch according to a first embodiment of the present disclosure, and an ink supply system having the same.

Exemplary embodiments according to the present disclosure will be described in detail with reference to accompanying drawings.

However, various changes to the following embodiments are possible and the scope of the present disclosure is not limited to the following embodiments. In these drawings, the shapes and sizes of elements may be exaggerated for explicit description, and the same reference numerals are used throughout the different drawings to designate the same or similar components.

As used herein, it will be understood that when an element is referred to as being “coupled” or “connected” to another element, it can be directly coupled or connected to the other element or electrically coupled or connected thereto with intervening elements that may be present therebetween. Furthermore, unless the context clearly indicates otherwise, it will be further understood that that the terms “comprises”, “comprising”, “includes” and/or “including”, when used herein, specify the presence of stated features, integers, steps, operations, elements, and/or components, but do not preclude the presence or addition of one or more other features, integers, steps, operations, elements, components, and/or groups thereof.

Terms such as a first term and a second term may be used for explaining various constitutive elements, but the constitutive elements should not be limited to these terms. These terms is used only for the purpose for distinguishing a constitutive element from other constitutive element. For example, a first constitutive element may be referred as a second constitutive element, and the second constitutive element may be also referred to as the first constitutive element.

FIG. 1 is a view showing an ink storage apparatus with a rotating type ink storage pouch according to a first embodiment of the present disclosure, and an ink supply system having the same.

The ink storage apparatus with the ink storage pouch of the present disclosure is applied first to the ink supply system that supplies ink to the ink-jet head. First, the ink supply system will be described.

The ink-jet head 100 is a part having a nozzle ejecting ink. The ink-jet printer shown in the drawing is configured for industrial use, so that the ink-jet head 100 and the ink storage apparatus are provided to be separated from each other. The detailed configuration of the ink-jet head 100 may adopt all technical configuration of the ink-jet head used conventionally without departing from a range that does not harm the characteristics of the present disclosure. Specifically, in order to prevent the nozzle of the ink-jet head 100 from being blocked by fine bubbles, the present disclosure may include the configuration that is for ejecting the micro bubbles outside the ink-jet head 100.

The ink storage apparatus is a part that stores ink to supply the ink to the ink-jet head 100. First ends of a supply flow path 110, which is for supplying the ink to the ink-jet head 100, and a recovery flow path 120, along which at least a part of the ink supplied to the ink-jet head 100 is circulated and returns, are connected to the ink storage apparatus, and a first end of a pressure control tube 310 for maintaining the meniscus state is connected to the ink storage apparatus.

Second ends of the supply flow path 110 and the recovery flow path 120 of which the first ends are connected to the ink storage apparatus are connected to the ink-jet head 100. The ink-jet head 100 is supplied with ink via the supply flow path 110 and performs ink-jet printing via the nozzle. As at least a part of the supplied ink is recovered to the ink storage apparatus via the recovery flow path 120, the ink is circulated.

A second end of the pressure control tube 310 is connected to a gas pressure control system 300, and the gas pressure control system 300 controls the pressure in the ink storage apparatus, thereby applying negative pressure into the ink storage apparatus in order for the ink in the ink-jet head 100 to be maintained in the meniscus state. Generally, in the case of using the gas pressure control system directly connected to the ink storage apparatus without using a pouch, there is a configuration of constantly suctioning air via the pressure control tube 310, so as bubbles formed in the ink storage apparatus break, a droplet of ink spreading upward may move via the pressure control tube 310. The droplet of the ink flowing into the pressure control tube 310 causes failure of the gas pressure control system 300.

A circulation pump 130 is provided on the recovery flow path 120 that recovers at least a part of ink supplied to the ink-jet head 100 to the ink storage apparatus, and circulates the ink. In the embodiment shown in the drawing, it is shown that the circulation pump 130 is provided on the recovery flow path 120, but it is not limited thereto and the circulation pump 130 may be provided on the supply flow path 110. As shown in the drawing, as the circulation pump 130 is configured to constantly circulate ink between the ink storage apparatus and the ink-jet head 100, the dispersibility of the ink can be maintained, and at this point, it is preferable to prevent an operation of the circulation pump 130 from affecting the meniscus state.

A buffer storing part 400 may be applied to inject ink into the ink storage apparatus without harming the meniscus state, and an additional supply flow path 410 is connected to the ink storage apparatus to supply the ink to the ink storage apparatus. In a process of injecting ink from the buffer storing part 400 to the ink storage apparatus, it is controlled to maintain the meniscus state, but when ink is added into the buffer storing part 400, ink can be added without considering the meniscus state, so a process of adding ink from the external space is easier. There is a loss when printing stops in a process of adding ink consumed by performing printing, but when ink is added via the buffer storing part 400, ink can be constantly added without stopping a printing process.

In the case of applying the existing generally used structure of the ink storage apparatus to the ink supply system of the ink-jet head, the ink stored in the ink storage apparatus or a droplet of the ink may be introduced into the gas pressure control system 300 via the pressure control tube 310.

The ink storage apparatus of the present disclosure adopts a new structure that can prevent the ink or a droplet of the ink from being introduced into the gas pressure control system 300.

The ink storage apparatus of the embodiment includes an ink pouch 200, an airtight casing 210, a pouch holding part 220, and a pouch rotating part 230.

The ink pouch 200 is a space in which ink is stored, and is made of a flexible material and can adjust the pressure with respect to the ink stored in the ink pouch 200 according to the external atmospheric pressure. A material of the ink pouch 200 can be applied without a specific limitation as long as the material is a flexible material. For example, when a solution that does not need to consider chemical resistance is used, a polypropylene (PP) material may be applied, and when a solution that requires consideration of chemical resistance is used, Teflon may be applied. A shape of the ink pouch 200 is not particularly limited, and a general pouch shape storing a liquid may be applied to the ink pouch, and particularly, the ink pouch may have a wide and flat pouch shape.

The supply flow path 110 and the recovery flow path 120 are connected to the ink pouch 200. As described above, it can be understood that the fact that the supply flow path 110 and the recovery flow path 120 are connected to the ink pouch 200 corresponds to the entire function and configuration of the conventional general ink storage apparatus. However, the ink pouch 200 of the present disclosure has a difference that the ink pouch 200 is not directly connected to the gas pressure control system 300, from the existing ink storage apparatus. Explaining in detail later, in the present disclosure, the gas pressure control system 300 is connected only to the airtight casing 210, and has a configuration that is completely separated from the ink pouch 200.

Eventually, in the present disclosure, since ink is stored in the separate ink pouch 200 that is not connected to the gas pressure control system 300, even when ink is excessively injected into the ink pouch 200, a problem that the ink injected into the ink pouch 200 is introduced into the gas pressure control system 300 can be prevented. Moreover, since the ink pouch 200 is completely separated from the gas pressure control system 300, the ink pouch has a structure in which a droplet generated from the ink exists only inside the ink pouch 200 and is prevented from being introduced into the gas pressure control system 300. Therefore, there is an excellent effect that prevents in advance the problem that ink or an ink droplet is introduced into the gas pressure control system 300. Furthermore, compared to the conventional structure in which ink is stored in a space of which internal pressure is lowered by the gas pressure control system 300, ink is stored in the ink pouch 200 completely separated from the gas pressure control system 300, so there is an effect of suppressing evaporation of the stored ink.

The airtight casing 210 accommodates the ink pouch 200 therein, and the airtight casing 210 is a housing with airtightness that is connected to the gas pressure control system 300 via the pressure control tube 310, so that pressure with respect to the ink stored in the ink pouch 200 is applied by adjusting gas pressure. The gas pressure control system 300 may control the internal pressure of the airtight casing 210, and the change in the gas pressure in the airtight casing 210 affects the ink pouch 200 of a flexible material provided inside the airtight casing 210. Therefore, when negative pressure is applied into the airtight casing 210, the gas pressure around the ink pouch 200 with a flexible material is lowered and thus the negative pressure is also applied into the ink pouch 200. When positive pressure is applied into the airtight casing 210, the gas pressure around the ink pouch 200 of a flexible material increases and thus the positive pressure is also applied into the ink pouch 200.

Since the conventional ink storage apparatus is configured such that ink is directly stored in the inside portion of the housing connected to the pressure control tube 310 of the gas pressure control system 300, when ink is excessively injected, the ink is introduced into the gas pressure control system 300, and there is a problem that an ink droplet generated due to a reason such as burst of bubbles of the ink stored therein is introduced into the gas pressure control system 300. In the embodiment, the gas pressure control system 300 is connected only to the airtight casing 210, and the ink pouch 200 in which ink is separately stored is separated in the airtight casing 210. Therefore, in a method for adjusting the gas pressure inside the airtight casing 210 to indirectly adjust internal pressure of the ink pouch 200 of a flexible material, the meniscus state can be maintained and the problem that ink or an ink droplet is introduced into the gas pressure control system 300 is prevented.

The pouch holding part 220 is configured to hold the ink pouch 200, and is adopted to rotate the ink pouch 200 of a flexible material. The present disclosure adopts a structure of rotating stored ink for maintaining the dispersibility of the ink, but the ink pouch 200 in which ink is stored is made of a flexible material, so it is difficult to rotate the ink pouch 200 itself. In order to solve the difficulty, the structure is applied such that the ink pouch 200 is securely installed at the pouch holding part 220, and the pouch rotating part 230 rotates the pouch holding part 220 on the predetermined rotating shaft to rotate the ink pouch 200 held by the pouch holding part 220.

Meanwhile, as described above, it is preferable that the ink pouch 200 is manufactured into a flat pouch shape, and when the ink pouch 200 is installed in a vertical state, ink exists only at a lower portion among the entire volume of the ink pouch 200 and there is a disadvantage that the shape of the ink pouch 200 is not sufficiently used, and when the ink pouch 200 is installed in a horizontal state, there is a disadvantage that it is difficult to discharge ink when the amount of ink is small. Therefore, it is preferable that the ink pouch 200 is arranged in an inclined state at a predetermined angle, so that ink is distributed throughout the entire ink pouch 200 compared to the vertical installation case and ink stored in the ink pouch 200 is efficiently used compared to the horizontal installation case. In order to install the ink pouch 200 in an inclined state, the pouch holding part 220 holding the ink pouch 200 is installed to be inclined at a predetermined angle, the rotating shaft allowing the pouch holding part 220 to be rotated is famed at the same angle.

The pouch rotating part 230 is connected to the pouch holding part 220 via the predetermined rotating shaft, and the pouch holding part 220 is rotated on the rotating shaft to rotate the ink pouch 200 held by the pouch holding part 220, resulting an effect of agitating the ink stored in the ink pouch 200.

Meanwhile, as described above, the supply flow path 110 through which ink is supplied to the ink-jet head 100 and the recovery flow path 120 through which at least a part of the ink supplied to the ink-jet head 100 is circulated and returned are connected to the ink pouch 200. However, in the present disclosure, since the ink pouch 200 is rotated by rotating the pouch holding part 220, when the supply flow path 110 and the recovery flow path 120 are connected to the ink pouch 200 in a general method, there is a problem that the supply flow path 110 and the recovery flow path 120 are twisted in response to rotation of the pouch holding part 220. In order to solve the problem, the supply flow path 110 and the recovery flow path 120 are connected to the ink pouch 200 via anti-twist connecting parts 222, and it is preferable that the anti-twist connecting parts 222 are located on the rotating shaft of the pouch holding part 220. As described above, in order to uniformly distribute ink throughout the entire ink pouch 200 and facilitate discharge of ink stored in the ink pouch 200, the pouch holding part 220 in which the ink pouch 200 is installed is arranged to be inclined at the predetermined angle, and thus the rotating shaft of the pouch holding part 220 is also inclined at the predetermined angle. At this point, when the supply flow path 110 is connected to a relatively lower anti-twist connecting part of the two anti-twist connecting parts 222 located on the rotating shaft of the pouch holding part 220 and the recovery flow path 120 is connected to a relatively upper anti-twist connecting part thereof, ink can be efficiently supplied into the ink-jet head 100 regardless of the amount of ink stored in the ink pouch 200.

Furthermore, the additional supply flow path 410 must be connected to the ink pouch 200 to add ink without harming the meniscus state, but due to the nature of the structure in which the ink pouch 200 is rotated, the additional supply flow path 410 cannot be connected to any other location other than the supply flow path 110 and the recovery flow path 120 connected to the two anti-twist connecting parts 222 located on the rotating shaft. Therefore, the additional supply flow path 410 is configured to be connected to the recovery flow path 120 or be connected to the anti-twist connecting parts 222 to which the recovery flow path 120 is connected together with the recovery flow path 120.

In the embodiment, the ink-jet printer including the ink storage apparatus with the rotating type ink storage pouch can prevent a problem that ink or an ink droplet is introduced into the gas pressure control system applying negative pressure by separating the space in which the gas pressure control system controls pressure from the space in which ink is stored.

Furthermore, as the pouch-shaped ink pouch is installed to be inclined at the predetermined angle, the efficiency of storage and use of ink, and as the ink pouch is rotated, the dispersibility of ink can be maintained.

Figure 2:
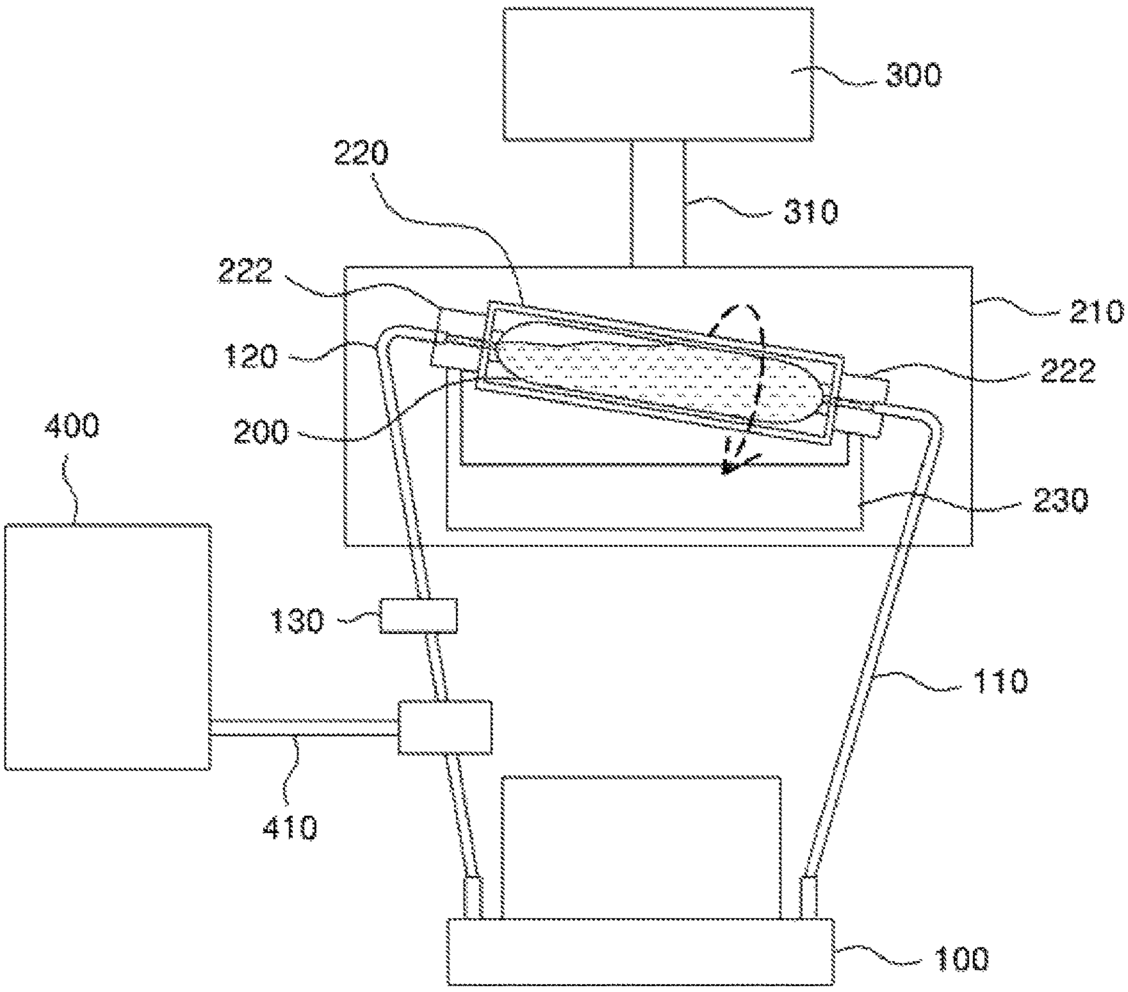
FIG. 2 is a view showing the ink storage apparatus with the rotating type ink storage pouch according to a second embodiment of the present disclosure, and the ink supply system having the same.

FIG. 2 is a view showing the ink storage apparatus with the rotating type ink storage pouch according to a second embodiment of the present disclosure, and the ink supply system having the same.

The ink storage apparatus with the ink storage pouch of the present disclosure is applied first to the ink supply system that supplies ink to the ink-jet head. First, the ink supply system will be described.

The ink-jet head 100 is a part having the nozzle ejecting ink. The ink-jet printer shown in the drawing is configured for industrial use, so that the ink-jet head 100 and the ink storage apparatus are provided to be separated from each other. The detailed configuration of the ink-jet head 100 may adopt all technical configuration of the ink-jet head used conventionally without departing from a range that does not harm the characteristics of the present disclosure. Specifically, in order to prevent the nozzle of the ink-jet head 100 from being blocked by fine bubbles, the present disclosure may include the configuration that is for ejecting the micro bubbles outside the ink-jet head 100.

The ink storage apparatus is a part that stores ink to supply the ink to the ink-jet head 100. The first ends of the supply flow path 110, which is for supplying the ink to the ink-jet head 100, and of the recovery flow path 120, along which at least a part of the ink supplied to the ink-jet head 100 is circulated and returns, are connected to the ink storage apparatus, and the first end of the pressure control tube 310 for maintaining the meniscus state is connected to the ink storage apparatus.

The second ends of the supply flow path 110 and the recovery flow path 120 of which the first ends are connected to the ink storage apparatus are connected to the ink-jet head 100. The ink-jet head 100 is supplied with ink via the supply flow path 110 and performs ink-jet printing via the nozzle. As at least a part of the supplied ink is recovered to the ink storage apparatus via the recovery flow path 120, the ink is circulated.

The second end of the pressure control tube 310 is connected to the gas pressure control system 300, and the gas pressure control system 300 controls the pressure in the ink storage apparatus, thereby applying negative pressure into the ink storage apparatus in order for the ink in the ink-jet head 100 to be maintained in the meniscus state. Generally, in the case of using the gas pressure control system directly connected to the ink storage apparatus without using a pouch, there is a configuration of constantly suctioning air via the pressure control tube 310, so as bubbles formed in the ink storage apparatus break, a droplet of ink spreading upward may move via the pressure control tube 310. The droplet of the ink flowing into the pressure control tube 310 causes failure of the gas pressure control system 300.

The circulation pump 130 is provided on the recovery flow path 120 that recovers at least a part of ink supplied to the ink-jet head 100 to the ink storage apparatus, and circulates the ink. In the embodiment shown in the drawing, it is shown that the circulation pump 130 is provided on the recovery flow path 120, but it is not limited thereto and the circulation pump 130 may be provided on the supply flow path 110. As shown in the drawing, as the circulation pump 130 is configured to constantly circulate ink between the ink storage apparatus and the ink-jet head 100, the dispersibility of the ink can be maintained, and at this point, it is preferable to prevent an operation of the circulation pump 130 from affecting the meniscus state.

The buffer storing part 400 may be applied to inject ink into the ink storage apparatus without harming the meniscus state, and the additional supply flow path 410 is connected to the ink storage apparatus to supply the ink to the ink storage apparatus. In a process of injecting ink from the buffer storing part 400 to the ink storage apparatus, it is controlled to maintain the meniscus state, but when ink is added into the buffer storing part 400, ink can be added without considering the meniscus state, so the process of adding ink from the external space is easier. There is a loss when printing stops in the process of adding ink consumed by performing printing, but when ink is added via the buffer storing part 400, ink can be constantly added without stopping the printing process.

In the case of applying the existing generally used structure of the ink storage apparatus to the ink supply system of the ink-jet head, the ink stored in the ink storage apparatus or a droplet of the ink may be introduced into the gas pressure control system 300 via the pressure control tube 310.

The ink storage apparatus of the present disclosure adopts a new structure that can prevent the ink or a droplet of the ink from being introduced into the gas pressure control system 300.

The ink storage apparatus of the present disclosure includes the ink pouch 200, the airtight casing 210, the pouch holding part 220, the pouch rotating part 230, and a load cell 500.

The ink pouch 200 is a space in which ink is stored, and is made of a flexible material and can adjust the pressure with respect to the ink stored in the ink pouch 200 according to the external atmospheric pressure. A material of the ink pouch 200 can be applied without a specific limitation as long as the material is a flexible material, and for example, when a solution that does not need to consider chemical resistance is used, a polypropylene (PP) material may be applied, and when a solution that requires consideration of chemical resistance is used, Teflon may be applied. A shape of the ink pouch 200 is not particularly limited, and a general pouch shape storing a liquid may be applied to the ink pouch, and particularly, the ink pouch may have a wide and flat pouch shape.

The supply flow path 110 and the recovery flow path 120 are connected to the ink pouch 200. As described above, it can be understood that the fact that the supply flow path 110 and the recovery flow path 120 are connected to the ink pouch 200 corresponds to the entire function and configuration of the conventional general ink storage apparatus. However, the ink pouch 200 of the present disclosure has a difference that the ink pouch 200 is not directly connected to the gas pressure control system 300, from the existing ink storage apparatus. Explaining in detail later, in the present disclosure, the gas pressure control system 300 is connected only to the airtight casing 210, and has a configuration that is completely separated from the ink pouch 200.

Eventually, in the present disclosure, since ink is stored in the separate ink pouch 200 that is not connected to the gas pressure control system 300, even when ink is excessively injected into the ink pouch 200, a problem that the ink injected into the ink pouch 200 is introduced into the gas pressure control system 300 can be prevented. Moreover, since the ink pouch 200 is completely separated from the gas pressure control system 300, the ink pouch has a structure in which a droplet generated from the ink exists only inside the ink pouch 200 and is prevented from being introduced into the gas pressure control system 300. Therefore, there is an excellent effect that prevents in advance the problem that ink or an ink droplet from is introduced into the gas pressure control system 300. Furthermore, compared to the conventional structure in which ink is stored in a space of which internal pressure is lowered by the gas pressure control system 300, ink is stored in the ink pouch 200 completely separated from the gas pressure control system 300, so there is an effect of suppressing evaporation of the stored ink.

The airtight casing 210 accommodates the ink pouch 200 therein, and the airtight casing 210 is a housing with airtightness that is connected to the gas pressure control system 300 via the pressure control tube 310, so that pressure with respect to the ink stored in the ink pouch 200 by adjusting gas pressure is applied. The gas pressure control system 300 may control the internal pressure of the airtight casing 210, and the change in the gas pressure in the airtight casing 210 affects the ink pouch 200 of a flexible material provided inside the airtight casing 210. Therefore, when negative pressure is applied into the airtight casing 210, gas pressure around the ink pouch 200 with a flexible material is lowered and thus negative pressure is also applied into the ink pouch 200. When positive pressure is applied into the airtight casing 210, gas pressure around the ink pouch 200 of a flexible material increases and thus positive pressure is also applied into the ink pouch 200.

Since the conventional ink storage apparatus is configured such that ink is directly stored in the inside portion of the housing connected to the pressure control tube 310 of the gas pressure control system 300, when ink is excessively injected, the ink is introduced into the gas pressure control system 300, and there is a problem that an ink droplet generated due to a reason such as burst of bubbles of the ink stored therein is introduced into the gas pressure control system 300. In the embodiment, the gas pressure control system 300 is connected only to the airtight casing 210, and the ink pouch 200 in which ink is separately stored is separated in the airtight casing 210. Therefore, in a method for adjusting gas pressure inside the airtight casing 210 to indirectly adjust internal pressure of the ink pouch 200 of a flexible material, the meniscus state can be maintained and the problem that ink or an ink droplet is introduced into the gas pressure control system 300 is prevented.

The pouch holding part 220 is configured to hold the ink pouch 200, and is adopted to rotate the ink pouch 200 of a flexible material. The present disclosure adopts a structure of rotating stored ink for maintaining the dispersibility of the ink, but the ink pouch 200 in which ink is stored is made of a flexible material, so it is difficult to rotate the ink pouch 200 itself. In order to solve the difficulty, the structure is applied such that the ink pouch 200 is securely installed at the pouch holding part 220, and the pouch rotating part 230 rotates the pouch holding part 220 on the predetermined rotating shaft to rotate the ink pouch 200 held by the pouch holding part 220.

Meanwhile, as described above, it is preferable that the ink pouch 200 is manufactured into a flat pouch shape, and when the ink pouch 200 is installed in a vertical state, ink exists only at a lower portion among the entire volume of the ink pouch 200 and there is a disadvantage that the shape of the ink pouch 200 is not sufficiently used, and when the ink pouch 200 is installed in a horizontal state, there is a disadvantage that it is difficult to discharge ink when the amount of ink is small. Therefore, it is preferable that the ink pouch 200 is arranged in an inclined state at a predetermined angle, so that ink is distributed throughout the entire ink pouch 200 compared to the vertical installation case and ink stored in the ink pouch 200 is efficiently used compared to the horizontal installation case. In order to install the ink pouch 200 in an inclined state, the pouch holding part 220 holding the ink pouch 200 is installed to be inclined at a predetermined angle, the rotating shaft allowing the pouch holding part 220 to be rotated is famed at the same angle.

The pouch rotating part 230 is connected to the pouch holding part 220 via the predetermined rotating shaft, and the pouch holding part 220 is rotated on the rotating shaft to rotate the ink pouch 200 held by the pouch holding part 220, resulting an effect of agitating the ink stored in the ink pouch 200.

Meanwhile, as described above, the supply flow path 110 through which ink is supplied to the ink-jet head 100 and the recovery flow path 120 through which at least a part of the ink supplied to the ink-jet head 100 is circulated and returned are connected to the ink pouch 200. However, in the present disclosure, since the ink pouch 200 is rotated by rotating the pouch holding part 220, when the supply flow path 110 and the recovery flow path 120 are connected to the ink pouch 200 in a general method, there is a problem that the supply flow path 110 and the recovery flow path 120 are twisted in response to rotation of the pouch holding part 220. In order to solve the problem, the supply flow path 110 and the recovery flow path 120 are connected to the ink pouch 200 via anti-twist connecting parts 222, and it is preferable that the anti-twist connecting parts 222 are located on the rotating shaft of the pouch holding part 220. As described above, in order to uniformly distribute ink throughout the entire ink pouch 200 and facilitate discharge of ink stored in the ink pouch 200, the pouch holding part 220 in which the ink pouch 200 is installed is arranged to be inclined at the predetermined angle, and thus the rotating shaft of the pouch holding part 220 is also inclined at the predetermined angle. At this point, when the supply flow path 110 is connected to a relatively lower anti-twist connecting part of the two anti-twist connecting parts 222 located on the rotating shaft of the pouch holding part 220 and the recovery flow path 120 is connected to a relatively upper anti-twist connecting part thereof, ink can be efficiently supplied into the ink-jet head 100 regardless of the amount of ink stored in the ink pouch 200.

Furthermore, the additional supply flow path 410 must be connected to the ink pouch 200 to add ink without harming the meniscus state, but due to the nature of the structure in which the ink pouch 200 is rotated, the additional supply flow path 410 cannot be connected to any other location other than the supply flow path 110 and the recovery flow path 120 connected to the two anti-twist connecting parts 222 located on the rotating shaft. Therefore, the additional supply flow path 410 is configured to be connected to the recovery flow path 120 or be connected to the anti-twist connecting parts 222 to which the recovery flow path 120 is connected together with the recovery flow path 120.

The load cell 500 is a component that measures the weight of the airtight casing 210, and confirms the amount of ink stored in the ink pouch 200. In the present disclosure, since the ink pouch 200 installed inside the airtight casing 210 is rotated together with the pouch holding part 220, it is difficult to confirm the amount of the ink stored in the ink pouch 200. Accordingly, in the embodiment, the load cell 500 measuring the weight of the airtight casing 210 receiving the ink pouch 200 is applied, so that the amount of the ink stored in the ink pouch 200 can be confirmed. In the airtight casing 210, in addition to the ink pouch 200, components such as the pouch holding part 220 and the pouch rotating part 230 are installed, but the weight thereof is constant, so that only the amount of the ink stored in the ink pouch 200 is a reason causing change of the entire weight of the airtight casing 210. Therefore, the amount of the ink stored in the ink pouch 200 can be obtained with the load cell 500 measuring the weight of the airtight casing 210. At this point, the configuration measuring the weight of the ink stored in the ink pouch 200 to obtain the amount of the ink stored in the ink pouch 200 is not limited to the embodiment shown in the drawing, and the configuration for measurement of the weight may be installed in the airtight casing 210.

In the embodiment, the ink-jet printer including the ink storage apparatus with the rotating type ink storage pouch can prevent a problem that ink or an ink droplet is introduced into the gas pressure control system applying negative pressure by separating the space in which the gas pressure control system controls pressure from the space in which ink is stored.

Furthermore, as the pouch-shaped ink pouch is installed to be inclined at the predetermined angle, the efficiency of storage and use of ink, and as the ink pouch is rotated, the dispersibility of ink can be maintained.

Moreover, there is an effect of measuring the weight of the ink to precisely confirm the amount of the ink stored in the ink pouch.

Figure 3:
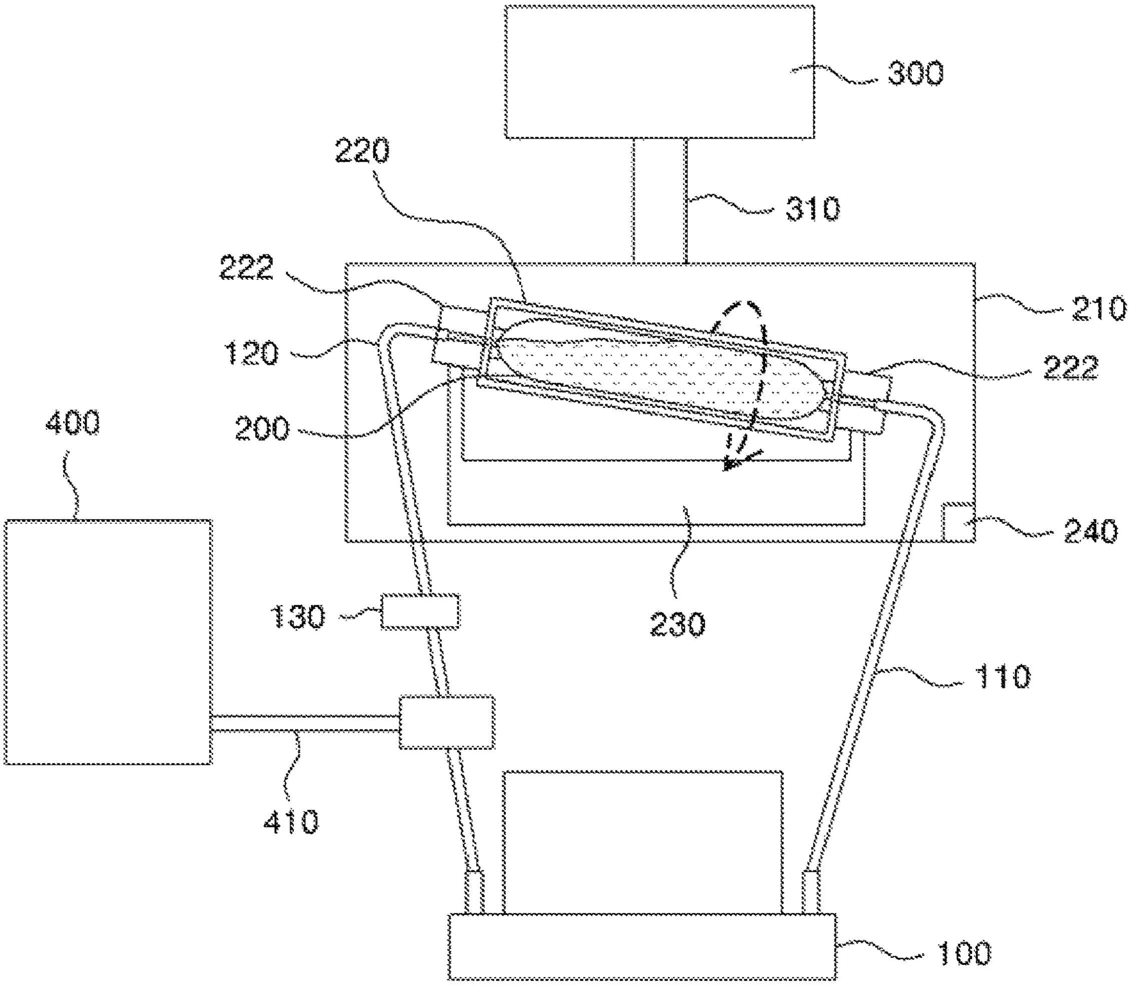
FIG. 3 is a view showing the ink storage apparatus with the rotating type ink storage pouch according to a third embodiment of the present disclosure, and the ink supply system having the same.
Figure 4:
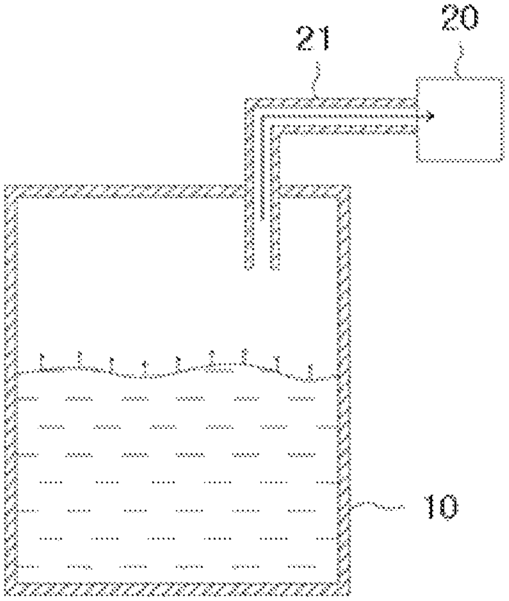
FIG. 4 is a view showing relationship between the ink storage apparatus in which ink is stored and a gas pressure control system in the conventional ink-jet printer.
Figure 5:
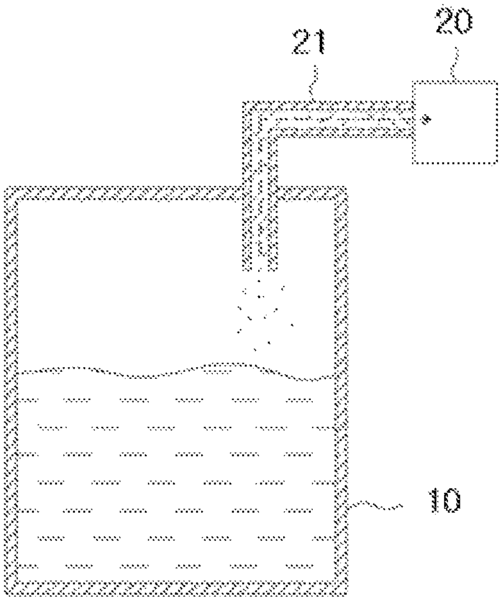
FIG. 5 is a view showing a droplet of ink that flows toward the gas pressure control system, between the ink storage apparatus storing ink and the gas pressure control system in the conventional ink-jet printer.

FIG. 3 is a view showing the ink storage apparatus with the rotating type ink storage pouch according to a third embodiment of the present disclosure, and the ink supply system having the same.

The ink storage apparatus with the ink storage pouch of the present disclosure is applied first to the ink supply system that supplies ink to the ink-jet head. First, the ink supply system will be described.

The ink-jet head 100 is a part having the nozzle ejecting ink. The ink-jet printer shown in the drawing is configured for industrial use, so that the ink-jet head 100 and the ink storage apparatus are provided to be separated from each other. The detailed configuration of the ink-jet head 100 may adopt all technical configuration of the ink-jet head used conventionally without departing from a range that does not harm the characteristics of the present disclosure. Specifically, in order to prevent the nozzle of the ink-jet head 100 from being blocked by fine bubbles, the present disclosure may include the configuration that is for ejecting the micro bubbles outside the ink-jet head 100.

The ink storage apparatus is a part that stores the ink to supply the ink to the ink-jet head 100. The first ends of the supply flow path 110, which is for supplying the ink to the ink-jet head 100, and the recovery flow path 120, along which at least a part of the ink supplied to the ink-jet head 100 is circulated and returns, are connected to the ink storage apparatus, and the first end of the pressure control tube 310 for maintaining the meniscus state is connected thereto.

The second ends of the supply flow path 110 and the recovery flow path 120 of which the first ends are connected to the ink storage apparatus are connected to the ink-jet head 100. The ink-jet head 100 is supplied with ink via the supply flow path 110 and performs ink-jet printing via the nozzle. As at least a part of the supplied ink is recovered to the ink storage apparatus via the recovery flow path 120, the ink is circulated.

The second end of the pressure control tube 310 is connected to the gas pressure control system 300, and the gas pressure control system 300 controls the pressure in the ink storage apparatus, thereby applying negative pressure into the ink storage apparatus in order for the ink in the ink-jet head 100 to be maintained in the meniscus state. Generally, in the case of using the gas pressure control system directly connected to the ink storage apparatus without using a pouch, there is a configuration of constantly suctioning air via the pressure control tube 310, so as bubbles formed in the ink storage apparatus break, a droplet of ink spreading upward may move via the pressure control tube 310. The droplet of the ink flowing into the pressure control tube 310 causes failure of the gas pressure control system 300.

The circulation pump 130 is provided on the recovery flow path 120 that recovers at least a part of ink supplied to the ink-jet head 100 to the ink storage apparatus, and circulates the ink. In the embodiment shown in the drawing, it is shown that the circulation pump 130 is provided on the recovery flow path 120, but it is not limited thereto and the circulation pump 130 may be provided on the supply flow path 110. As shown in the drawing, as the circulation pump 130 is configured to constantly circulate ink between the ink storage apparatus and the ink-jet head 100, the dispersibility of the ink can be maintained, and at this point, it is preferable to prevent an operation of the circulation pump 130 from affecting the meniscus state.

The buffer storing part 400 may be applied to inject ink into the ink storage apparatus without harming the meniscus state, and the additional supply flow path 410 is connected to the ink storage apparatus to supply the ink to the ink storage apparatus. In the process of injecting ink from the buffer storing part 400 to the ink storage apparatus, it is controlled to maintain the meniscus state, but when ink is added into the buffer storing part 400, ink can be added without considering the meniscus state, so the process of adding ink from the external space is easier. There is a loss when printing stops in a process of adding ink consumed by performing printing, but when ink is added via the buffer storing part 400, ink can be constantly added without stopping the printing process.

In the case of applying the existing generally used structure of the ink storage apparatus to the ink supply system of the ink-jet head, the ink stored in the ink storage apparatus or a droplet of the ink may be introduced into the gas pressure control system 300 via the pressure control tube 310.

The ink storage apparatus of the present disclosure adopts a new structure that can prevent the ink or a droplet of the ink from being introduced into the gas pressure control system 300.

The ink storage apparatus of the embodiment includes the ink pouch 200, the airtight casing 210, the pouch holding part 220, the pouch rotating part 230, and a leakage detection sensor 240.

The ink pouch 200 is a space in which ink is stored, and is made of a flexible material and can adjust the pressure with respect to the ink stored in the ink pouch 200 according to the external atmospheric pressure. A material of the ink pouch 200 can be applied without a specific limitation as long as the material is a flexible material, and for example, when a solution that does not need to consider chemical resistance is used, a polypropylene (PP) material may be applied, and when a solution that requires consideration of chemical resistance is used, Teflon may be applied. A shape of the ink pouch 200 is not particularly limited, and a general pouch shape storing a liquid may be applied to the ink pouch, and particularly, the ink pouch may have a wide and flat pouch shape.

The supply flow path 110 and the recovery flow path 120 are connected to the ink pouch 200. As described above, it can be understood that the fact that the supply flow path 110 and the recovery flow path 120 are connected to the ink pouch 200 corresponds to the entire function and configuration of the conventional general ink storage apparatus. However, the ink pouch 200 of the present disclosure has a difference that the ink pouch 200 is not directly connected to the gas pressure control system 300, from the existing ink storage apparatus. Explaining in detail later, in the present disclosure, the gas pressure control system 300 is connected only to the airtight casing 210, and has a configuration that is completely separated from the ink pouch 200.

Eventually, in the present disclosure, since ink is stored in the separate ink pouch 200 that is not connected to the gas pressure control system 300, even when ink is excessively injected into the ink pouch 200, a problem that the ink injected into the ink pouch 200 is introduced into the gas pressure control system 300 can be prevented. Moreover, since the ink pouch 200 is completely separated from the gas pressure control system 300, the ink pouch has a structure in which a droplet generated from the ink exists only inside the ink pouch 200 and is prevented from being introduced into the gas pressure control system 300. Therefore, there is an excellent effect that prevents in advance the problem that ink or an ink droplet from is introduced into the gas pressure control system 300. Furthermore, compared to the conventional structure in which ink is stored in a space of which internal pressure is lowered by the gas pressure control system 300, ink is stored in the ink pouch 200 completely separated from the gas pressure control system 300, so there is an effect of suppressing evaporation of the stored ink.

The airtight casing 210 accommodates the ink pouch 200 therein, and the airtight casing 210 is a housing with airtightness that is connected to the gas pressure control system 300 via the pressure control tube 310, so that pressure with respect to the ink stored in the ink pouch 200 is applied by adjusting gas pressure. The gas pressure control system 300 may control the internal pressure of the airtight casing 210, and the change in the gas pressure in the airtight casing 210 affects the ink pouch 200 of a flexible material provided inside the airtight casing 210. Therefore, when negative pressure is applied into the airtight casing 210, gas pressure around the ink pouch 200 with a flexible material is lowered and thus negative pressure is also applied into the ink pouch 200. When positive pressure is applied into the airtight casing 210, gas pressure around the ink pouch 200 of a flexible material increases and thus positive pressure is also applied into the ink pouch 200.

Since the conventional ink storage apparatus is configured such that ink is directly stored in the inside portion of the housing connected to the pressure control tube 310 of the gas pressure control system 300, when ink is excessively injected, the ink is introduced into the gas pressure control system 300, thereby causing a problem that an ink droplet generated due to a reason such as burst of bubbles of the ink stored therein is introduced into the gas pressure control system 300. In the embodiment, the gas pressure control system 300 is connected only to the airtight casing 210, and the ink pouch 200 in which ink is separately stored is separated in the airtight casing 210. Therefore, in a method for adjusting gas pressure inside the airtight casing 210 to indirectly adjust internal pressure of the ink pouch 200 of a flexible material, the meniscus state can be maintained and the problem that ink or an ink droplet is introduced into the gas pressure control system 300 is prevented.

The pouch holding part 220 is configured to hold the ink pouch 200, and is adopted to rotate the ink pouch 200 of a flexible material. The present disclosure adopts a structure of rotating stored ink for maintaining the dispersibility of the ink, but the ink pouch 200 in which ink is stored is made of a flexible material, so it is difficult to rotate the ink pouch 200 itself. In order to solve the difficulty, the structure is applied such that the ink pouch 200 is securely installed at the pouch holding part 220, and the pouch rotating part 230 rotates the pouch holding part 220 on the predetermined rotating shaft to rotate the ink pouch 200 held to the pouch holding part 220.

Meanwhile, as described above, it is preferable that the ink pouch 200 is manufactured into a flat pouch shape, and when the ink pouch 200 is installed in a vertical state, ink exists only at a lower portion among the entire volume of the ink pouch 200 and there is a disadvantage that the shape of the ink pouch 200 is not sufficiently used, and when the ink pouch 200 is installed in a horizontal state, there is a disadvantage that it is difficult to discharge ink when the amount of ink is small. Therefore, it is preferable that the ink pouch 200 is arranged in an inclined state at a predetermined angle, so that ink is distributed throughout the entire ink pouch 200 compared to the vertical installation case and ink stored in the ink pouch 200 is efficiently used compared to the horizontal installation case. In order to install the ink pouch 200 in an inclined state, the pouch holding part 220 holding the ink pouch 200 is installed to be inclined at a predetermined angle, the rotating shaft allowing the pouch holding part 220 to be rotated is famed at the same angle.

The pouch rotating part 230 is connected to the pouch holding part 220 via the predetermined rotating shaft, and the pouch holding part 220 is rotated on the rotating shaft to rotate the ink pouch 200 held to the pouch holding part 220, resulting an effect of agitating the ink stored in the ink pouch 200.

Meanwhile, as described above, the supply flow path 110 through which ink is supplied to the ink-jet head 100 and the recovery flow path 120 through which at least a part of the ink supplied to the ink-jet head 100 is circulated and returned are connected to the ink pouch 200. However, in the present disclosure, since the ink pouch 200 is rotated by rotating the pouch holding part 220, when the supply flow path 110 and the recovery flow path 120 are connected to the ink pouch 200 in a general method, there is a problem that the supply flow path 110 and the recovery flow path 120 are twisted in response to rotation of the pouch holding part 220. In order to solve the problem, the supply flow path 110 and the recovery flow path 120 are connected to the ink pouch 200 via anti-twist connecting parts 222, and it is preferable that the anti-twist connecting parts 222 are located on the rotating shaft of the pouch holding part 220. As described above, in order to uniformly distribute ink throughout the entire ink pouch 200 and facilitate discharge of ink stored in the ink pouch 200, the pouch holding part 220 in which the ink pouch 200 is installed is arranged to be inclined at the predetermined angle, and thus the rotating shaft of the pouch holding part 220 is also inclined at the predetermined angle. At this point, when the supply flow path 110 is connected to a relatively lower anti-twist connecting part of the two anti-twist connecting parts 222 located on the rotating shaft of the pouch holding part 220 and the recovery flow path 120 is connected to a relatively upper anti-twist connecting part thereof, ink can be efficiently supplied into the ink-jet head 100 regardless of the amount of ink stored in the ink pouch 200.

Furthermore, the additional supply flow path 410 must be connected to the ink pouch 200 to add ink without harming the meniscus state, but due to the nature of the structure in which the ink pouch 200 is rotated, the additional supply flow path 410 cannot be connected to any other location other than the supply flow path 110 and the recovery flow path 120 connected to the two anti-twist connecting parts 222 located on the rotating shaft. Therefore, the additional supply flow path 410 is configured to be connected to the recovery flow path 120 or be connected to the anti-twist connecting parts 222 to which the recovery flow path 120 is connected together with the recovery flow path 120.

The leakage detection sensor 240 is installed in the airtight casing 210 to detect leakage of ink from the ink pouch 200. When the ink pouch 200 is damaged or ink is excessively injected into the ink pouch 200, ink may leak from the ink pouch 200. The leaking ink may be evaporated and introduced into the gas pressure control system 300, causing failure of the gas pressure control system 300. Therefore, it is important to quickly detect ink leaking from the ink pouch 200. Various sensors that may detect a liquid may be applied as the leakage detection sensor 240, and the leakage detection sensor is not particularly limited. When an inclination is formed on the bottom surface of the airtight casing 210 and the leakage detection sensor 240 is installed at a lowest portion thereof, even when a small amount of ink leaks, leakage of the ink can be detected.

In the embodiment, the ink-jet printer including the ink storage apparatus with the rotating type ink storage pouch can prevent a problem that ink or an ink droplet is introduced into the gas pressure control system applying negative pressure by separating the space in which the gas pressure control system controls pressure from the space in which ink is stored.

Furthermore, as the pouch-shaped ink pouch is installed to be inclined at the predetermined angle, the efficiency of storage and use of ink, and as the ink pouch is rotated, the dispersibility of ink can be maintained.

Moreover, as a sensor that detects ink leaking from the ink pouch to the internal space of the airtight casing is included, a problem that the ink leaking from the ink pouch is introduced into the gas pressure control system applying negative pressure can be prevented.

Hereinabove, the present disclosure has been described with reference to the preferred embodiments. Although the preferred embodiments of the present disclosure have been described for illustrative purposes, those skilled in the art will appreciate that various modifications, additions and substitutions are possible, without departing from the scope and spirit of the present disclosure as disclosed in the accompanying claims. Therefore, the protection scope of the present disclosure should be interpreted by the matters described in the accompanying claims, not by the specific embodiment, and all technical ideas within the equivalent scope should be construed as being included in the scope of the present disclosure.

What is claimed is:

1. An ink storage apparatus with a rotating type ink storage pouch, the storage apparatus being configured to store ink to supply the ink to an ink-jet head comprising a nozzle ejecting ink, the ink storage apparatus comprising:
- an ink pouch made of a flexible material, and configured to store ink therein and to supply the stored ink to the ink-jet head;
- an airtight casing in which the ink pouch is provided, the airtight casing being connected to a gas pressure control system;
- a pouch holding part provided inside the airtight casing, and configured to hold the ink pouch while the ink pouch is inclined at a predetermined angle; and
- a pouch rotating part configured to rotate the pouch holding part on a predetermined rotating shaft to agitate the ink stored in the ink pouch,
- wherein the gas pressure control system is configured to control gas pressure of an internal space of the airtight casing, the internal space being separated from the ink, thereby allowing the ink stored in the ink pouch to maintain the meniscus state thereof at the ink-jet head.

2. The ink storage apparatus of claim 1, further comprising:
- two anti-twist connecting parts located on the rotating shaft of the pouch holding part, and to which a supply flow path and a recovery flow path are respectively connected, wherein first ends of the supply flow path and the recovery flow path are connected to the ink pouch and a second end of the supply flow path allows ink to be supplied to the ink-jet head and a second end of the recovery flow path allows ink discharged from the ink-jet head to be injected back to the ink pouch.

3. The ink storage apparatus of claim 2, wherein an additional supply flow path configured to add ink to the ink pouch is connected to the recovery flow path or one of the anti-twist connecting parts to which the recovery flow path is connected.

4. The ink storage apparatus of claim 1, further comprising:
- a weight measurement part configured to measure weight of the ink stored in the ink pouch to obtain the amount of the ink stored in the ink pouch.

5. The ink storage apparatus of claim 1, further comprising:
- a leakage detection sensor provided on a bottom of the airtight casing and configured to detect leaking ink.

6. An ink-jet printer having an ink storage apparatus with a rotating type ink storage pouch, the ink-jet printer comprising:
- an ink-jet head comprising a nozzle ejecting ink;
- the ink storage apparatus configured to store ink to supply the ink to the ink-jet head; and
- a gas pressure control system connected to the ink storage apparatus and configured to control internal pressure such that the ink stored in the ink storage apparatus maintains the meniscus state thereof at the ink-jet head,
- wherein the ink storage apparatus comprises:
- an ink pouch made of a flexible material, and configured to store ink therein and to supply the stored ink to the ink-jet head;

an airtight casing in which the ink pouch is provided, the airtight casing being connected to a gas pressure control system;

a pouch holding part provided inside the airtight casing, and configured to hold the ink pouch while the ink pouch is inclined at a predetermined angle; and a pouch rotating part configured to rotate the pouch holding part on a predetermined rotating shaft to agitate the ink stored in the ink pouch, wherein the gas pressure control system is configured to control gas pressure of an internal space of the airtight casing, the internal space being separated from the ink, thereby allowing the ink stored in the ink pouch to maintain the meniscus state thereof at the ink-jet head.

7. The ink-jet printer of claim 6, further comprising:

two anti-twist connecting parts located on the rotating shaft of the pouch holding part, and to which a supply flow path and a recovery flow path are respectively connected, wherein first ends of the supply flow path and the recovery flow path are connected to the ink pouch and a second end of the supply flow path allows ink to be supplied to the ink-jet head and a second end of the recovery flow path allows ink discharged from the ink-jet head to be injected back to the ink pouch.

8. The ink-jet printer of claim 7, wherein an additional supply flow path configured to add ink to the ink pouch is connected to the recovery flow path or one of the anti-twist connecting parts to which the recovery flow path is connected.

9. The ink-jet printer of claim 6, further comprising:

a weight measurement part configured to measure weight of the ink stored in the ink pouch to obtain the amount of the ink stored in the ink pouch.

10. The ink-jet printer of claim 6, further comprising:

a leakage detection sensor provided on a bottom of the airtight casing and configured to detect leaking ink.

* * * * *